United States Patent [19]

Statton et al.

[11] 4,444,676

[45] Apr. 24, 1984

[54] STABILIZED POLYOXYALKYLENE POLYETHER POLYOLS AND POLYURETHANE FOAMS PREPARED THEREFROM

[75] Inventors: Gary L. Statton, West Chester; James M. Gaul, Exton, both of Pa.

[73] Assignee: Atlantic Richfield Company, Los Angeles, Calif.

[21] Appl. No.: 481,215

[22] Filed: Apr. 1, 1983

[51] Int. Cl.$^3$ .................. C08G 18/14; C07L 41/12
[52] U.S. Cl. ..................... 252/182; 521/117; 521/121; 521/128; 521/130; 521/166; 524/291; 524/352; 524/353; 524/258; 524/83; 568/582; 252/403
[58] Field of Search ............... 252/182, 403; 521/117, 521/121, 128, 130, 166; 524/291, 352, 353, 258, 83; 568/182

[56] References Cited

U.S. PATENT DOCUMENTS

| | | | |
|---|---|---|---|
| 3,428,567 | 2/1969 | Newton | 252/188.3 |
| 3,437,694 | 4/1969 | Austin | 260/611.5 |
| 3,494,880 | 2/1970 | Austin | 521/117 |
| 3,567,664 | 3/1971 | Haring | 521/128 |
| 3,637,865 | 1/1972 | Haring | 260/611.5 |
| 3,953,398 | 4/1976 | Kline | 524/291 |
| 4,007,230 | 2/1977 | Hinze | 568/182 |
| 4,010,211 | 3/1977 | Preston et al. | 521/117 |
| 4,228,247 | 10/1980 | Moore et al. | 521/107 |
| 4,265,783 | 5/1981 | Hinze | 521/117 |
| 4,363,745 | 12/1982 | Hinze | 252/404 |

*Primary Examiner*—John Kight, III
*Assistant Examiner*—M. L. Moore
*Attorney, Agent, or Firm*—Delbert E. McCaslin

[57] ABSTRACT

Polyoxyalkylene polyether polyols are stabilized against oxidative degradation by incorporating therein a synergistic stabilizing composition containing (1) a mixture of butylated phenols consisting of 2-tertiary butyl phenol, 3,5-ditertiary butyl-4-hydroxyhydrocinnamate and 1,6-hexamethylene bis(3,5-ditertiary-butyl-4-hydroxyhydrocinnamate) or tetrakis [methylene(3,5-ditertiary butyl-4-hydroxyhydrocinnamate)] methane (2) a p,p'-dialkyldiphenylamine such as p,p'-dioctyldiphenylamine and (3) a phenothiazine compound. Polyurethane foams are stabilized against scorching when the stabilized polyols are utilized in the foam preparation or the stabilizing composition is added with other reactants.

10 Claims, No Drawings

STABILIZED POLYOXYALKYLENE POLYETHER POLYOLS AND POLYURETHANE FOAMS PREPARED THEREFROM

BACKGROUND OF THE INVENTION

The present invention is directed to a method for the stabilization of polyoxyalkylene polyether polyols and to the use of the stabilized polyol in the preparation of polyurethane foams. In particular, the invention relates to the heat and oxidation stabilization of polyoxyalkylene polyether polyols with certain synergistic stabilizing compositions and the color and/or scorch stabilization of polyurethane foams made from the polyols by reaction with an organic polyisocyanate.

Prior art methods for the oxidative stabilization of polyoxyalkylene polyether polyols and for the use of such antioxidant-containing polyether polyols in the preparation of polyurethane foams to inhibit scorch are well known.

U.S. Pat. No. 3,428,567 discloses a stabilizer for polyols and halogenated lower aliphatic hydrocarbons consisting of phenothiazine. U.S. Pat. No. 3,437,694 teaches the use of 2,6-di-t-butyl-4-methylphenol and 2,4-dimethyl-6-t-butylphenol as polyol stabilizers. U.S. Pat. No. 3,567,664 discloses the stabilization of polyurethane foams against scorch when a mixture of p,p'-dialkyl diphenyl amine and 2,6-ditertiary-butyl-4-methyl phenol is present in a foam forming reaction mixture. U.S. Pat. No. 3,637,865 shows the polyether polyols stabilized against oxidation with a mixture of 2,6-ditertiary-butyl-4-methyl phenol and p,p'-dialkyl diphenyl amine. U.S. Pat. No. 4,007,230 teaches the stabilization of polyether polyols using a mixture of certain hindered phenols such as 2,4-dimethyl-6-octyl phenol and 4,4'-bis-(α,α-dimethylbenzyl) diphenyl amine as well as to prevent scorch in polyurethanes. U.S. Pat. No. 4,228,247 discloses a mixture of 2,6-ditertiary-butyl-4-methyl phenol with amines such as p,p'-dioctyl diphenylamine or 4,4'-bis(α,α-dimethyl benzyl)diphenylamine, a phosphite such as phenyldidecylphosphite and 3,5-di-tertiary-butyl-4-hydroxyhydrocinnamate acid triester of 1,3,5-tris(2-hydroxyether)-5-triazine-2,4,6-(1H,3H, 5H)trione. U.S. Pat. No. 4,265,783 shows polyols stabilized against oxidative degradation with a combination of sterically hindered phenols, 4,4'-bis-(α,α-dimethylbenzyl)diphenylamine and phenothiazine. There is no teaching in the prior art of the synergistic effect obtained by stabilizing polyether polyols with the composition of the instant invention.

SUMMARY OF THE INVENTION

This invention relates to a novel method for the stabilization of a polyoxyalkylene polyether polyol by incorporating in said polyether polyol a synergistic antioxidant composition and a method of inhibiting scorch development in polyurethane foams prepared from the stabilized polyether polyols or added with other reactants.

Specifically the invention relates to a method for the stabilization of a polyoxyalkylene polyether polyol against oxidative degradation and the use of the stabilized polyether polyol with polyisocyanates to prepare a scorch stabilized polyurethane foam said polyether polyol containing a synergistic stabilizing composition consisting of (a) from about 9 to about 95 percent by weight of a mixture of butylated phenols consisting of from 25 to 85 percent by weight of 2-tertiary butyl phenol, 10 to 65 percent by weight of methyl 3,5-ditertiary butyl-4-hydroxyhydrocinnamate and 5 to 25 percent by weight of 1,6-hexamethylene bis(3,5-ditertiary butyl-4-hydroxyhydrocinnamate) or tetrakis [methylene (3,5-di-tertiary butyl-4-hydroxyhydrocinnamate)]methane, and (b) from about 9 to 95 percent by weight of a p,p'-dialkyldiphenylamine wherein said alkyl contains between 3 and 18 carbon atoms and (c) from about 0.0010 to 15 percent by weight of a phenothiazine compound of the formula

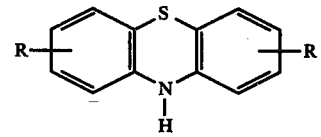

wherein R is independently hydrogen or an alkyl group having from 1 to 12 carbon atoms.

It is a primary object of this invention to provide a novel method for stabilizing polyoxyalkylene polyether polyols against oxidative degradation.

A further object is to provide a novel method for the preparation of a color and/or scorch stabilized polyurethane foam.

These and other objects and advantages of this invention will become apparent from the description of the invention which follows and from the claims.

DETAILED DESCRIPTION OF THE INVENTION

According to the present invention, polyoxyalkylene polyether polyols are stabilized against oxidative degradation by incorporating therein from about 0.10 to 5 and preferably between 0.2 to 1 percent by weight of a synergistic stabilizing composition which contains (a) from about 9 to 95 percent by weight of a mixture of butylated phenols consisting of from 25 to 85 percent by weight of 2-tertiary butyl phenol, 10 to 65 percent by weight of methyl 3,5-ditertiary butyl-4-hydroxyhydrocinnamate and 5 to 25 percent by weight of 1,6-hexamethylene bis(3,5-ditertiary butyl-4-hydroxyhydrocinnamate) or tetrakis [methylene (3,5-di-tertiary butyl-4-hydroxyhydrocinnamate)]methane, and (b) from about 9 to 95 percent by weight of a p,p'-dialkyldiphenylamine wherein said alkyl contains between 3 and 18 carbon atoms and (c) from about 0.0010 to 15 percent by weight of a phenothiazine compound of the formula

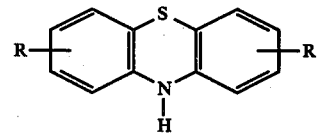

wherein R is independently hydrogen or an alkyl group having from 1 to 12 carbon atoms. The present invention also pertains to the preparation of scorch stabilized polyurethane foams by reacting a polyisocyanate with the polyalkylene polyether polyols containing the above noted synergistic stabilizing composition.

Because of fluctuations and availability of the component materials used to stabilize polyoxyalkylene polyether polyols and reduce discoloration and scorch in the polyurethane foams prepared therefrom, it is desirable to find ways to decrease the quantities of the antioxidants required to provide effective stability and superior alternative components to do so.

It has been discovered that certain antioxidant mixtures consisting of between about 9 to 95 weight percent of butylated phenols including the lower cost and readily available 2-tertiary butyl with phenol, with from about 9 to 95 weight percent of a p,p-'dialkyldiphenyl amine with the alkyl group containing between 3 and 18 carbon atoms and from about 0.0010 to 15 weight percent of a phenothiazine compound of the formula

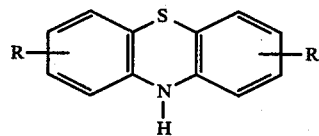

wherein R is independently hydrogen or an alkyl group having from 1 to 12 carbon atoms, results in a synergistic composition useful for enhancing the oxidative stability of polyoxyalkylene polyether polyols and effectively reducing scorch development and discoloration in polyurethane foams prepared therefrom. The butylated phenols are also liquid, thus, providing for ease of mixing and metering into the polyether polyol or polyurethane foam reactants to be stabilized.

The polyoxyalkylene polyether polyols which can be stabilized by the method of the present invention include those having from 2 to about 10 hydroxyl groups. Such polyether polyols and methods for their preparation are described in "Polyurethanes: Chemistry and Technology" by Saunders and Frisch, Interscience Publishers, 1964. Also described therein are polyurethane foams and methods for their preparation.

Particularly suitable polyoxyalkylene polyether polyols include those having molecular weights of from about 200 to 10,000 or higher and preferably molecular weights of from about 2000 to about 8000 and prepared by reacting an initiator compound having 2 to about 8 hydroxyl groups with an alkylene oxide or mixtures of such oxides.

Suitable initiator compounds include, for example, ethylene glycol, propylene glycol, water, dipropylene glycol, trimethylene glycol, 1,2-, 1,3- and 1,4-butanediol, glycerol, 1,2,6-hexanetriol, trimethylolethane, trimethylolpropane, pentaerythritol, sorbitol, sucrose and the like.

The alkylene oxides suitable for use include ethylene oxide, propylene oxide, 1,2- and 2,3-butylene oxide, styrene oxide, epichlorohydrin, epibromohydrin, and mixtures thereof, etc.

Preparation of polyurethane foams which includes the stabilizing composition of the present invention may be accomplished by any of the standard prior art procedures. Typical polyurethane foam preparation is disclosed for example in U.S. Pat. No. 3,567,664 noted above. Preparation includes the prepolymer quasi-prepolymer, or one-shot methods. Generally the stabilized polyoxyalkylene polyether polyols are reacted with an organic polyisocyanate in the presence of a catalyst, a surfactant and a blowing agent. Various other additives such as fillers, dyes, etc. may be added if desired. In order to obtain the optimum benefit of the stabilizing composition, it is preferably admixed with the polyalkylene polyether polyol prior to employing the polyol in the preparation of urethane foams. However, when degradation of the polyether polyol is not a problem, the stabilizing composition can be added with the other reactants when preparing the polyurethane foam. The proportion of the stabilizing composition, when employing the latter technique, would be based upon the proportion of polyalkylene polyether polyol described hereinabove.

The organic polyisocyanates which may be employed in the preparation of the scorch stabilized polyurethane foams according to this invention include diisocyanates, triisocyanates and polyisocyanates. Representative examples include for example toluene diisocyanate; an 80-20 percent mixture of 2,4- and 2,6-toluene diisocyanate; 4,4'-methylenebis(phenylisocyanate); 3,3'-bitoluene-4,4'-diisocyanate; 3,3'-dimethoxybiphenylene-4,4'-diisocyanate; naphthalene-1,5-diisocyanate; hexamethylene diisocyanate; 1,4-phenylene diisocyanate; polyphenylene polymethylene polyisocyanate, and the like.

The p,p'-dialkyldiphenyl amine employed in the synergistic stabilizing composition contains an alkyl moiety of between about 3 and 18 and preferably between 6 and 10 carbon atoms. Representative examples of suitable p,p'-dialkyldiphenyl amines include p,p'-dipropyl diphenyl amine, p,p'-dibutyl diphenyl amine, p,p'-diamyl diphenyl amine, p,p'-dihexyl diphenyl amine, p,p'-dioctyl diphenyl amine, p,p'-didodecyl diphenyl amine, p,p'-dioctodecyl diphenyl amine, and the like. The alkyl substituents of the amine compounds may be different on each phenyl group and mixtures of alkyl substituents may also be employed. For example, a suitable compound would include p-propyl-p'-octyl diphenylamine as well as similar amines having different alkyl substituents on the phenyl group.

Particularly suitable phenothiazine compounds which can be employed in the synergistic stabilizing composition herein include, for example, phenothiazine, 2-methylphenothiazine, 2,8-dioctylphenothiazine, mixtures thereof and the like.

The following examples are provided to illustrate the invention in accordance with the principles of this invention, including examples of a comparative nature, but are not be be construed as limiting the invention in any way except as indicated by the appended claims.

The oxidative stability (measure of oxidative degradation) of the polyoxyalkylene polyether polyols containing the synergistic stabilizing compositions were determined by placing the sample in a DuPont differential scanning calorimeter and the temperature at which decomposition occurred was recorded. In the stability determination, the polyether polyol samples weighing 2 mg±0.5 mg were placed in an aluminum pan which was placed in the differential scanning calorimeter cell along with a reference pan. The temperature of the cell was increased at 20° C./minute with an oxygen atmosphere purge. The temperature was plotted on the x axis and energy emitted or absorbed by the sample plotted on the y axis. The temperature at the time of initiation of decomposition was determined by locating the interception of the slope of exotherm deflection (y axis) and the base line x axis. The higher the temperature, the more stable the sample.

Resistance to foam scorch was determined by preparing low density flexible foams with polyether polyols containing the various stabilizing compositions, including a control with no stabilizer, which were then subjected to a scorch test. The formulation used to prepare the foams consisted of the following:

| | |
|---|---|
| Polyether polyol (3000 mol. wt.-Hydrox No. 56) | 100 parts by weight |
| Water | 5.3 parts by weight |
| Nonhydrolyzable Silicon surfactant | 0.9 parts by |
| 1,4-Diazabicyclo[2.2.2]-octane Catalyst (33% active) | 0.12 parts by weight |
| Stannous octoate catalyst | 0.25 parts by weight |
| Methylene chloride | 6.5 parts by weight |

The organic polyisocyanate was an 80/20 mixture of 2,4-2,6-toluene diisocyanate 112 Index. The first six components were mixed in a paper cup for 30 seconds at 2400 rpm. The toluene diisocyanate was added to the other components and stirred for 7 seconds at 2400 rpm. The mixture was then immediately poured into a 10″×10″×5″ box and allowed to rise. After 300 seconds from the start of the isocyanate mixing, the foam was placed into a preheated microwave oven for 8 minutes at a 30 percent power setting. At the end of the microwave treatment, the foam was allowed to cure at room temperature for 24 hours. The foam was then cut in half parallel to foam rise and the discoloration and scorch measured by use of a Gardner XL-10 Tristimulus Colorimeter as described in "A Rapid Predictive Foam Test for Urethane Foam Scorch" by M. J. Reali and B. A. Jacobs in the Journal of Cellular Plastics Nov./Dec. 1979 (Vol. 15, No. 6). Larger Δε values signify greater discoloration.

EXAMPLE 1

Various levels of the stabilizing compositions were added to a 3000 MW polyether polyol and tested for oxidative stability as described hereinabove.

| | Stabilizing Composition % By Weight Based on Polyol | | | |
|---|---|---|---|---|
| Samples | Butylated Phenols | p,p'-di-octyldi-phenyl amine | Phenothi-azine | Decomposition Temp. °C. |
| Sample A | — | — | — | 160 |
| Sample B | 0.25[1] | 0.20 | 0.01 | 209 |
| Sample C | 0.25[2] | 0.20 | 0.02 | 213 |
| Sample D | 0.20[1] | 0.09 | — | 200 |
| Sample E | — | — | 0.01 | 180 |

[1]45% by weight 2-tertiary butyl phenol, 45% methyl 3,5-di-tertiary butyl-4-hydroxyhydrocinnamate and 10% 1,6-hexamethylene bis(3,5-di-tertiary butyl-4-hydroxyhydrocinnamate).
[2]50% by weight 2-tertiary butyl phenol, 25% methyl 3,5-di-tertiary butyl-4-hydroxyhydrocinnamate and 25% tetrakis [methylene (3,5-di-tertiary butyl-4-hydroxyhydrocinnamate)]methane.

The results show that the combination of ingredients provide polyether polyol stability against oxidative degradation as measured by the initial decomposition temperature of polyol under an oxygen atmosphere.

EXAMPLE 2

Polyurethane foams were prepared as described above with polyols stabilized with varying concentrations of the ingredients as shown. The butylated phenol consisted of a mixture as used in Example 1, Sample B except for Sample F wherein only 2-t-butyl phenol was employed.

| | % By Weight Based on Polyol | | | |
|---|---|---|---|---|
| Samples | Butylated Phenols | p,p'-di-octyldi-phenyl amine | Phenothi-azine | Foam Discoloration |
| Sample A | 0.10 | 0.10 | — | 22.2 |
| Sample B | 0.10 | 0.10 | 0.015 | 18.1 |
| Sample C | 0.40 | 0.10 | 0.015 | 11.3 |
| Sample D | 0.40 | 0.20 | 0.015 | 9.6 |
| Sample E | — | — | — | burns |
| Sample F | 2-t-butyl phenol 0.40 | 0.10 | 0.015 | burns |

The example shows that discoloration and scorch is minimized and a synergistic effect exists when all of the ingredients are present. Comparison of Sample A and B shows the importance of all components in minimizing discoloration. Sample F shows the importance of having all ingredients in the butylated phenols and that the 2-tertiary butyl phenol alone does not provide the stabilization desired.

EXAMPLE 3

Polyurethane (PU) foams were prepared as above with various concentrations of the butylated phenols consisting of a mixture of 50% 2-t-butyl phenol, 25% methyl 3,5-ditert-butyl-4-hydroxyhydrocinnamate and 25% tetrakis [methylene (3,5-di-tert-butyl-4-hydroxyhydrocinnamate)] methane, p,p'-dioctyl diphenylamine and phenothiazine.

| | % By Weight Based on Polyol | | | |
|---|---|---|---|---|
| Samples | Butylated Phenols | p,p'-di-octyldi-phenyl amine | Phenothi-azine | PU Foam Discoloration |
| Sample A | 0.4 | 0.1 | — | 24.7 |
| Sample B | 0.1 | 0.3 | — | 30.2 |
| Sample C | 0.4 | 0.1 | 0.015 | 12.2 |
| Sample D | 0.1 | 0.3 | 0.015 | 17.7 |
| Sample E | 0.4 | 0.3 | 0.015 | 10.3 |
| Sample F | .25 | 0.20 | 0.0137 | 12.6 |
| Sample G | — | — | — | burns |

EXAMPLE 4

The procedure of Example 1 was repeated employing a 2±0.5 mg sample of the 3000 mol. weight polyether polyol to which was added a stabilizing composition consisting of 0.25 weight percent butylated phenols as used in Sample B, Example 1, and 0.20 weight percent 3 methylphenothiazine. Test results showed a decomposition temperature of 210.

EXAMPLE 5

The procedure of Example 1 was repeated employing a 2±0.5 mg sample of the 3000 mol. weight polyether polyol to which was added a stabilizing composition consisting of 0.20 weight percent butylated phenols as used in Sample C, Example 1, and 0.20 weight percent p,p'-dinonyl diphenylamine and 0.01 weight percent 3,5-dimethylphenothiazine. Test results showed a decomposition temperature of 212.

We claim:
1. A method for the stabilization of a polyoxyalkylene polyether polyol against oxidative degradation which comprises incorporating in said polyoxyalkylene poly- ether polyol from about 0.10 to 5 percent by weight of a synergistic stabilizing composition containing
  (a) from about 9 to about 95 percent by weight of a mixture of butylated phenols consisting of from 25 to 85 percent by weight of 2-tertiary butyl phenol, 10 to 65 percent by weight of methyl 3,5-ditertiary butyl-4-hydroxyhydrocinnamate and 5 to 25 percent by weight of 1,6-hexamethylene bis(3,5-di-tertiary butyl-4-hydroxyhydrocinnamate) or tetrakis [methylene (3,5-di-tertiary butyl-4-hydroxyhydrocinnamate)]methane, and
  (b) from about 9 to 95 percent by weight of a p,p'-dialkyldiphenylamine wherein said alkyl contains between 3 and 18 carbon atoms and
  (c) from about 0.0010 to 15 percent by weight of a phenothiazine compound of the formula

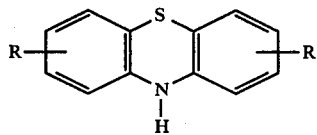

wherein R is independently hydrogen or an alkyl group having from 1 to 12 carbon atoms.

2. A method according to claim 1 wherein between 0.2 and 1 percent by weight stabilizing composition is incorporated in the polyether polyol.

3. A method according to claim 1 wherein the p,p'-dialkyldiphenylamine is p,p'-dioctyl diphenyl amine.

4. A method according to claim 1 wherein the p,p'-dialkyldiphenylamine is p,p'-dinonyl diphenyl amine.

5. A method according to claim 1 wherein the phenothiazine compound is 3-methyl phenothiazine.

6. A method according to claim 1 wherein the phenothiazine compound is phenothiazine.

7. A method for the preparation of a scorch stabilized polyurethane foam which comprises reacting an organic polyisocyanate with a polyoxyalkylene polyether polyol in the presence of a blowing agent, a surfactant and a reaction catalyst and from about 0.10 to 5 percent by weight of a scorch preventing and stabilizing composition consisting of
  (a) from about 9 to about 95 percent by weight of a mixture of butylated phenols consisting of from 25 to 85 percent by weight of 2-tertiary butyl phenol, 10 to 65 percent by weight of methyl 3,5-ditertiary butyl-4-hydroxyhydrocinnamate and 5 to 25 percent by weight of 1,6-hexamethylene bis(3,5-di-tertiary butyl-4-hydroxyhydrocinnamate) or tetrakis [methylene (3,5-di-tertiary butyl-4-hydroxyhydrocinnamate)]methane, and
  (b) from about 9 to 95 percent by weight of a p,p'-dialkyldiphenylamine wherein said alkyl contains between 3 and 18 carbon atoms and
  (c) from about 0.0010 to 15 percent by weight of a phenothiazine compound of the formula

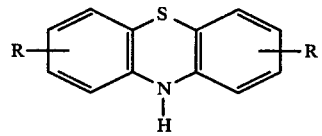

wherein R is independently hydrogen or an alkyl group having from 1 to 12 carbon atoms.

8. A method according to claim 7 wherein between 0.2 and 1 percent by weight of stabilizing composition is employed.

9. A method according to claim 7 wherein the p,p'-dialkyldiphenylamine is p,p'-dioctyl diphenyl amine.

10. A method according to claim 7 wherein the phenothiazine compound is phenothiazine.

* * * * *